US012087898B2

(12) United States Patent
Nicoara et al.

(10) Patent No.: US 12,087,898 B2
(45) Date of Patent: Sep. 10, 2024

(54) BATTERY GRID FEEDER FOR A PASTING MACHINE

(71) Applicant: Wirtz Manufacturing Company, Inc., Port Huron, MI (US)

(72) Inventors: Sergiu Nicoara, Port Huron, MI (US); Scott A. Mercurio, Clyde Twp., MI (US); Thomas J. Shaw, Forth Gratiot, MI (US); Frederick M. Hewett, Fort Gratiot, MI (US)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 272 days.

(21) Appl. No.: 17/677,053

(22) Filed: Feb. 22, 2022

(65) Prior Publication Data

US 2022/0271324 A1    Aug. 25, 2022

Related U.S. Application Data

(60) Provisional application No. 63/151,080, filed on Feb. 19, 2021.

(51) Int. Cl.
  *H01M 4/20*      (2006.01)
  *B05C 11/02*     (2006.01)
  *B05C 13/02*     (2006.01)
  *H01M 10/04*     (2006.01)

(52) U.S. Cl.
  CPC ....... *H01M 10/0404* (2013.01); *B05C 11/025* (2013.01); *B05C 13/02* (2013.01); *H01M 4/20* (2013.01)

(58) Field of Classification Search
  CPC ................................ H01M 4/20; B05C 5/004
  USPC ............................................................ 141/32
  See application file for complete search history.

(56) References Cited

U.S. PATENT DOCUMENTS

| 2,949,940 | A | * | 8/1960 | Lozo ..................... H01M 4/20 |
| | | | | 141/32 |
| 4,606,383 | A | | 8/1986 | Yanik |
| 4,932,443 | A | * | 6/1990 | Karolek ................. H01M 4/20 |
| | | | | 29/623.5 |
| 4,982,482 | A | | 1/1991 | Wheadon et al. |
| 5,577,908 | A | | 11/1996 | Glascock |
| 7,894,934 | B2 | | 2/2011 | Wallace et al. |

(Continued)

OTHER PUBLICATIONS

International Search Report and Written Opinion for International Application No. PCT/US22/17230 dated May 11, 2022 (14 pages).

*Primary Examiner* — Jason K Niesz

(74) *Attorney, Agent, or Firm* — REISING ETHINGTON, P.C.

(57) ABSTRACT

A grid guidance device for guiding battery grids to a battery pasting machine. The grid guidance device includes an assemblage of components that work together to adjust a position of a platform relative to a pasting orifice of the battery pasting machine. The platform receives the battery grids over it amid use of the grid guidance device. Multiple electric motors can be provided to rotate shafts for making the position adjustments. The position adjustments can involve one or more of the following: lateral positioning of the battery grids relative to the pasting orifice, advancement and retraction positioning of the platform relative to the pasting orifice, and/or raising and lowering positioning of the platform relative to the pasting orifice.

19 Claims, 8 Drawing Sheets

(56) References Cited

U.S. PATENT DOCUMENTS

| | | |
|---|---|---|
| 9,397,331 B2 | 7/2016 | Mendoza et al. |
| 9,437,867 B2 | 9/2016 | Mendoza et al. |
| 9,744,552 B2 | 8/2017 | Mendoza et al. |
| 2011/0259712 A1* | 10/2011 | Kuo .................. H01M 10/0404 198/369.2 |
| 2014/0083562 A1 | 3/2014 | Mendoza et al. |

* cited by examiner

BATTERY GRID FEEDER FOR A PASTING MACHINE

CROSS-REFERENCE TO RELATED APPLICATION

This application claims the benefit of U.S. Provisional Patent Application No. 63/151,080, with a filing date of Feb. 19, 2021, the contents of which are hereby incorporated by reference in their entirety.

TECHNICAL FIELD

This disclosure relates generally to lead-acid battery manufacturing equipment and, more particularly, to battery grid pasting machines for battery manufacture.

BACKGROUND

Machines for applying battery paste or active material to battery electrodes or grids (hereinafter sometimes both referred to as grids or battery grids) are known. Some of such machines have a paste hopper with an orifice plate having an orifice through which battery paste is discharged onto a grid or a continuous strip of sequentially connected grids typically received on and moved by a belt under the orifice. In order to overpaste one or both sides of the grids with a layer of battery paste extending in thickness outboard of one or both faces of the grid, it is necessary to pass the grids under the orifice so that they are spaced from the orifice to overpaste the adjacent side of the grids and to also space the grid from the belt to overpaste the other side of the grids. Typically, in such pasting machines, the battery grids slide on and over a bottom face of a guide plate as they are advanced toward the orifice. Usually, this guide plate is located upstream of the orifice with its downstream end closely adjacent to the orifice plate and is attached to the pasting machine. Upstream and downstream are relative to the direction of travel of the grids with respect to the orifice. Typically, the guide plate inclines the grids relative to an underlying run of the belt and spaces the grids from the orifice or both the orifice and the belt where the grids are advanced under the orifice.

Further, the guide plate is often designed for a specific configuration and thickness of grids and is disposed in a fixed position in the pasting machine relative to the orifice and the belt. Thus, a different configuration of a guide plate may be needed for each significantly different configuration and/or thickness of grids pasted by a given pasting machine. If a different setup is needed, it usually takes a significant amount of time to adjust the guide plate, commonly about 10 to 30 minutes or about 10 to 20 minutes. Also, when a strip of grids becomes jammed in the pasting machine, it may be necessary to disconnect the guide plate in order to clear or remove the jammed grids and then to reinstall the guide plate to continue use of the pasting machine. One such battery grid pasting machine is disclosed in U.S. Pat. No. 9,437,867 assigned to Wirtz Manufacturing Co, Inc.

SUMMARY

In an embodiment, a grid guidance device for guiding battery grids to a battery pasting machine may be provided. The grid guidance device may include a platform and an assembly operably associated with the platform in order to adjust the position of the platform with respect to a pasting orifice of the battery pasting machine. The platform is carried by the battery pasting machine at a location that is upstream of the pasting orifice of the battery pasting machine. The platform receives the battery grids over it before pasting of the battery grids occurs at the pasting orifice. The assembly may include a first electric motor, a first shaft, a second electric motor, a second shaft, a third electric motor, and a third shaft. A lateral position of the battery grids with respect to the pasting orifice is adjustable by way of rotation of the first shaft by the first electric motor. An advancement and retraction position of an exit end of the platform, or more of the platform, with respect to the pasting orifice is adjustable via rotation of the second shaft by the second electric motor. A raising and lowering position of the exit end of the platform, or more of the platform, with respect to the pasting orifice is adjustable via rotation of the third shaft by the third electric motor.

In an embodiment, a grid guidance device for guiding battery grids to a battery pasting machine may be provided. The grid guidance device may include a platform that receives the battery grids thereover. A first electric motor, a first shaft, and one or more mounting blocks may be provided. The first shaft has one or more threaded portions. The mounting block(s) is received on the first shaft at the threaded portion(s). A lateral position of the battery grids with respect to a pasting orifice of the battery pasting machines can be adjusted by way of rotation of the first shaft by the first electric motor. The mounting block(s) moves over the first shaft upon rotation of the first shaft. Further, a second electric motor, a second shaft, one or more racks, and one or more gears may be provided. An advancement and retraction position of an exit end, or more, of the platform with respect to the pasting orifice can be adjusted by way of rotation of the second shaft by the second electric motor. Engagement between the rack(s) and gear(s) occurs upon rotation of the second shaft. Yet further, a third electric motor, a third shaft, and one or more cams may be provided. The cam(s) is carried by the third shaft. A raising and lowering position of the exit end, or more, of the platform with respect to the pasting orifice can be adjusted by way of rotation of the third shaft by the third electric motor. Engagement from the cam(s) occurs upon rotation of the third shaft.

BRIEF DESCRIPTION OF THE DRAWINGS

The following detailed description of certain embodiments and best mode will be set forth with reference to the accompanying drawings in which:

FIG. 2 is a fragmentary sectional view taken generally on line 2-2 of

FIG. 1;

DETAILED DESCRIPTION

Figure 1:
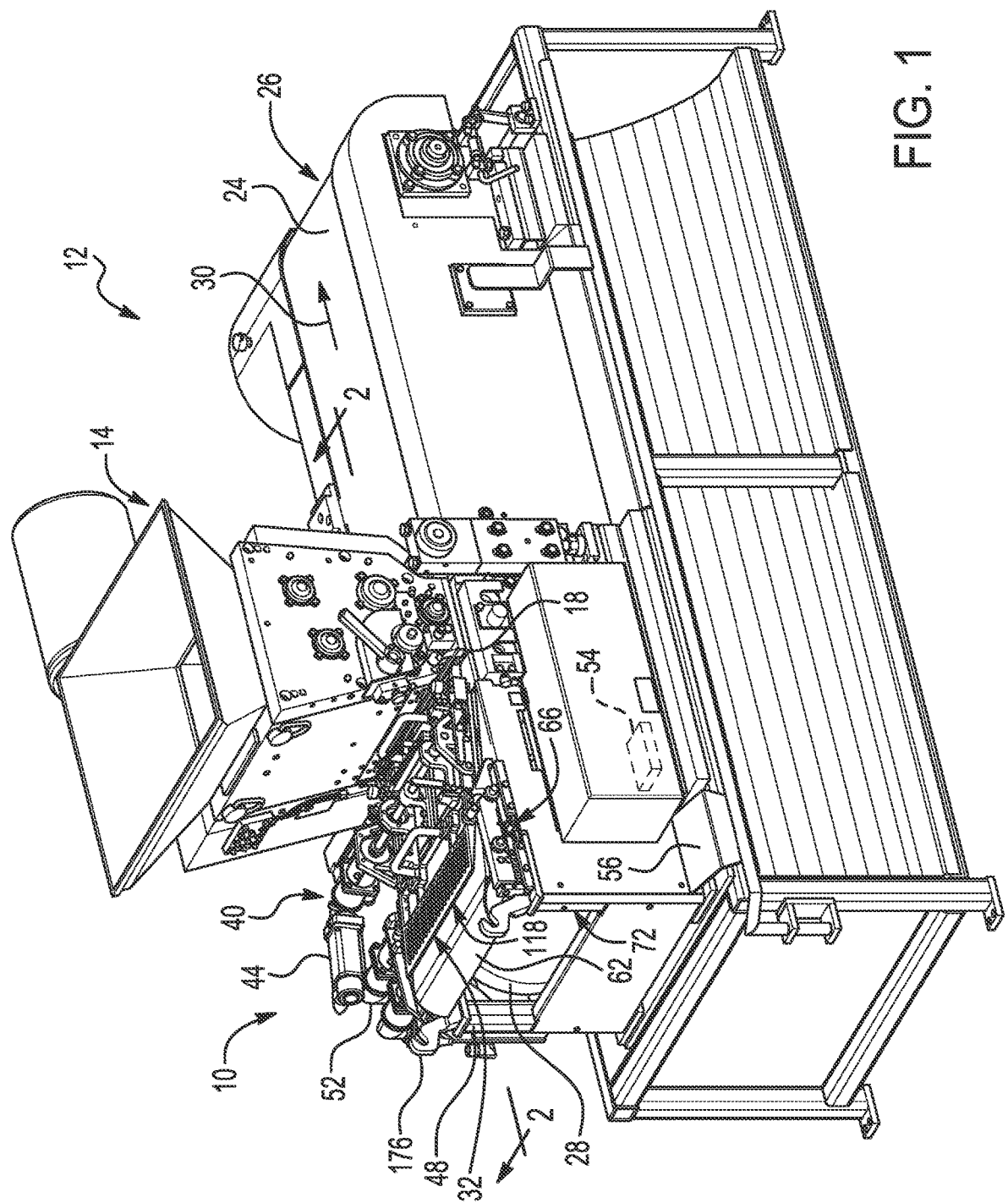
FIG. 1 is a perspective view of an embodiment of an automated grid guidance device operably associated with a battery grid pasting machine.
Figure 2:
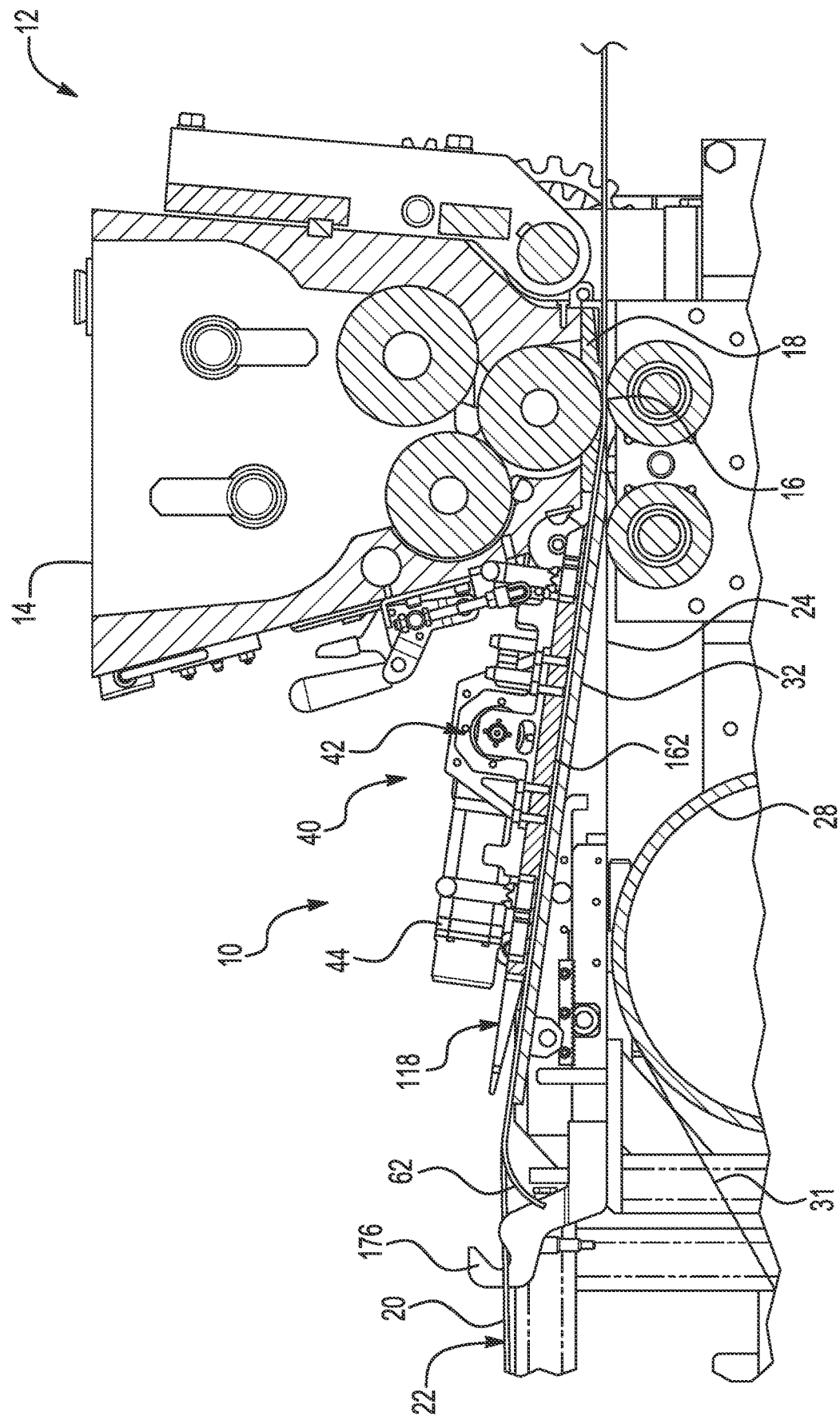

Referring in more detail to the drawings, FIG. 1 illustrates a battery grid guidance device 10—also called a battery grid feeder or entry table—associated and equipped with a battery grid pasting machine 12 which in operation discharges battery paste or active paste material from a hopper 14 through an orifice 16 (FIG. 2) in an orifice plate 18 onto battery grids 20 of a continuous strip 22 of sequentially connected grids moved under the orifice plate 18 and orifice 16 by an upper run 24 of a continuous belt 26 received over spaced apart rollers 28 at least one of which is driven by an electric motor to move the upper run 24 from upstream to downstream of the hopper 14 and orifice plate 18 in the direction of the arrow 30 in FIG. 1. As shown in FIG. 2, to prevent battery paste from contacting the belt 26 a pasting paper 31 may be received on the upper run 24 of the belt 26 beneath the continuous strip 22 of battery grids 20. If desired downstream of the hopper 14, another pasting paper may be applied to the upper face of the paste applied to the strip 22 of battery grids 20. As thus far described, the pasting machine 12 may have the construction and arrangement disclosed and described in U.S. Pat. No. 9,437,867 except for its fixed grid support structure or plate and guide assembly guiding a continuous strip of battery grids under its orifice plate and orifice. The '867 patent is assigned to Wirtz Manufacturing Co., Inc. which is the applicant of the present patent application and the disclosure of the '867 patent in its entirety is incorporated herein by reference.

Figure 3:
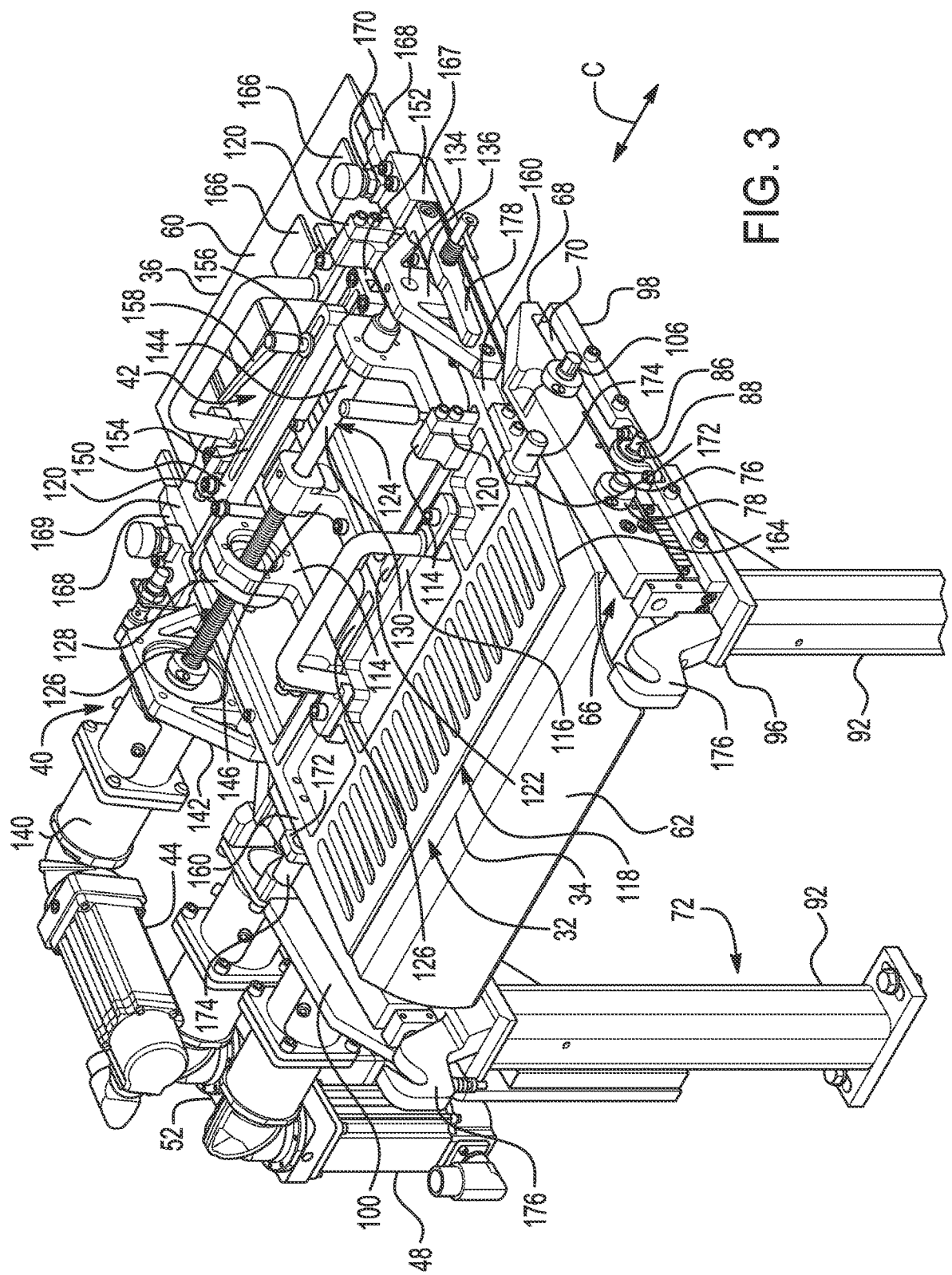
FIG. 3 is a perspective top view of the grid guidance device of FIG. 1.
Figure 4:
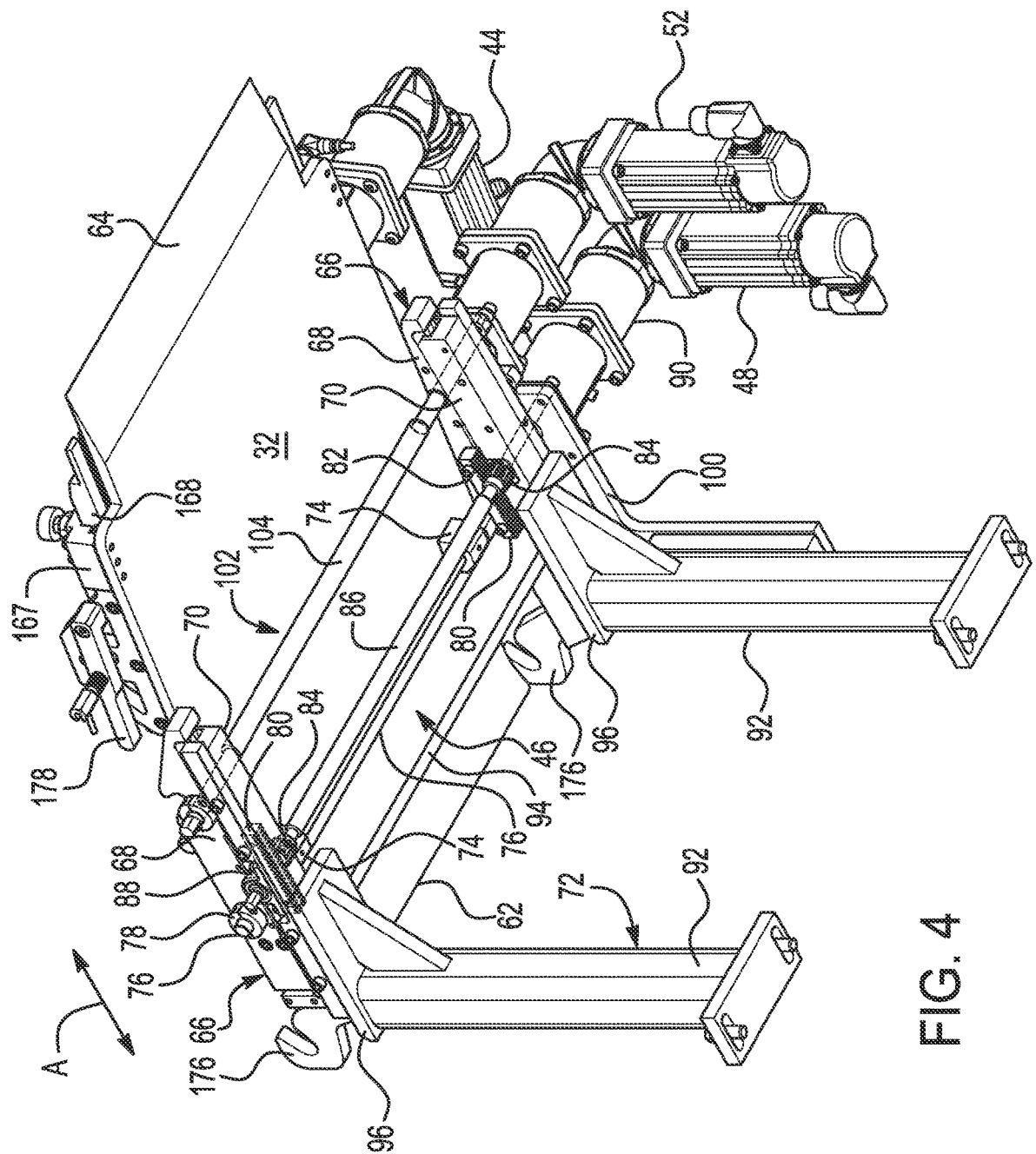
FIG. 4 is a perspective bottom view of the device of FIG. 1 showing a mechanism for advancing and retracting a platform of the device.
Figure 5:
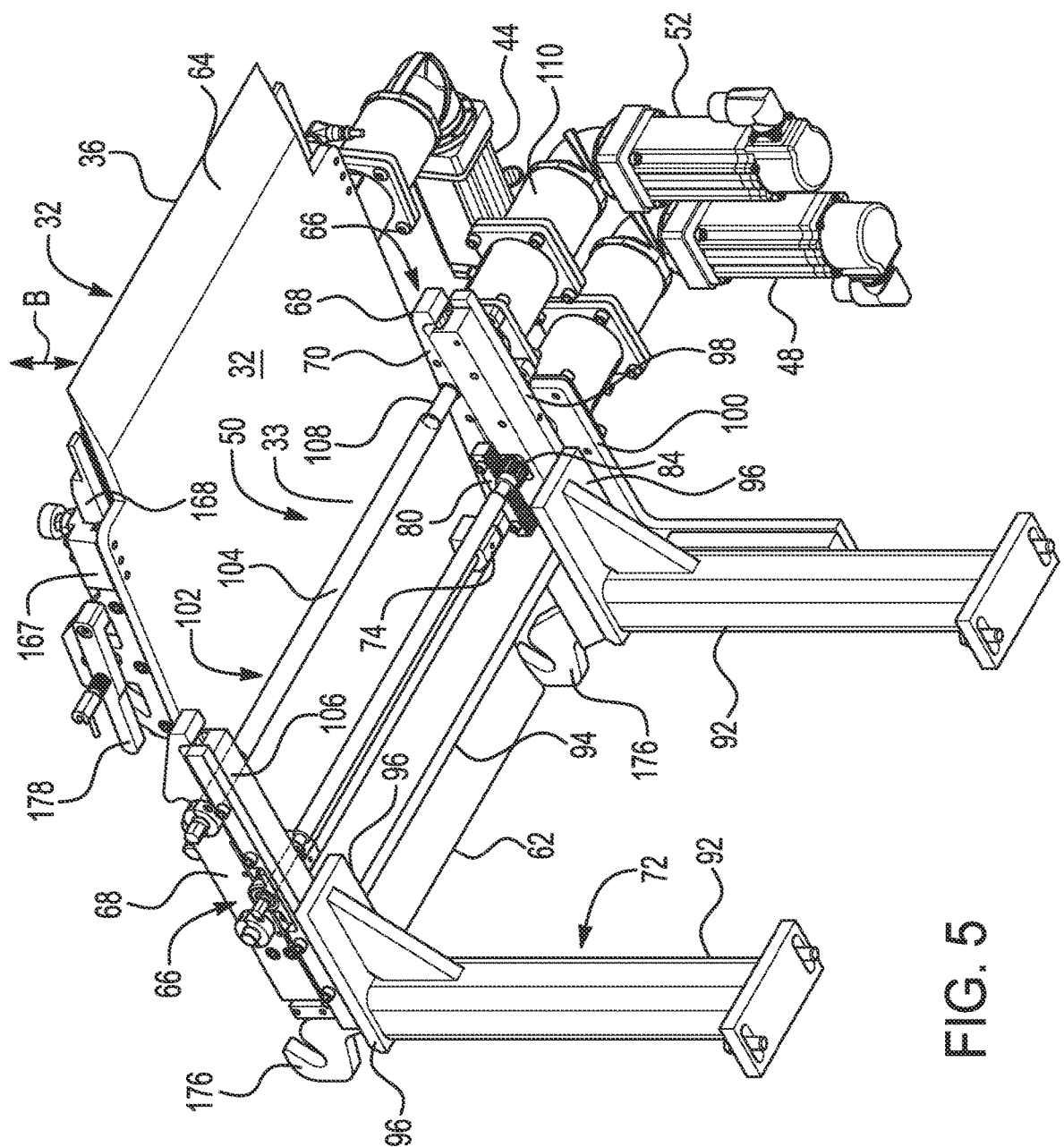
FIG. 5 is a perspective bottom view of the device of FIG. 1 showing a mechanism for raising and lowering a table of the device.

In operation, the grid guidance device 10 guides a continuous strip of battery grids under the orifice plate 18 and positions with respect to the orifice 16 and the portion under the orifice 16 of the upper run 24 of the belt 26, at least the portion of each grid as it passes under the orifice 16. The grid guidance device 10 can have various designs, constructions, and components in different embodiments depending upon—among other possible factors—the larger battery grid pasting machine 12 that it is equipped on and the strip of battery grids subject to pasting. In the embodiment of the figures, and as shown in FIG. 3, the grid guidance device 10 may have a table or platform 32 on which, in use, a portion of the continuous strip 22 of serially connected battery grids 20 is received and advanced from its upstream entrance end 34 to its downstream exit end 36 and which at least in part positions a portion of each grid as it moves across the orifice 16 of the pasting machine 12. The lateral position of the grid strip 22 transverse to its direction of travel may be adjusted and guided by a guide assembly 40 actuated by a guide adjustment mechanism 42 powered by a first electric motor 44. As best shown in FIG. 4, the platform 32 may be advanced and retracted relative to the orifice 16 by a platform drive mechanism 46 powered by a second electric motor 48, and as shown in FIG. 5, at least the downstream exit end 36 of the platform 32 may be raised and lowered by a lift mechanism 50 powered by a third electric motor 52. The guide assembly 40, platform drive mechanism 46, and lift mechanism 50 can each have various designs, constructions, and components in different embodiments depending upon—among other possible factors—the larger battery grid pasting machine 12 that they are equipped with and the strip of battery grids subject to adjustments and movements via the assemblies and mechanisms. The figures and accompanying description present just some potential embodiments.

Each of the first, second, and third electric motors 44, 48, and 52 may be reversible in its direction of rotation and desirably, per an embodiment, may be a reversible servo motor or a stepper motor. The operation of each of the electric motors 44, 48, 52 is controlled by an electronic controller 54 such as a programmable logic controller (PLC). Operation control can involve activation and actuation (i.e., ON) of the first, second, and third electric motors 44, 48, and 52, deactivation and deactuation (i.e., OFF) of the first, second, and third electric motors 44, 48, and 52, as well as rate of rotation imparted by the first, second, and third electric motors 44, 48, and 52, among other possible controls administered by the electronic controller 54. The electronic controller 54 may be associated with a human-machine interface (HMI) 56 which enables an operator to enter data and inputs to readily and easily adjust the position of the platform 32 to provide a desired position and location of a portion of each grid of the continuous strip 22 as such portion passes by the orifice 16 of the hopper 14 of a battery grid pasting machine such as machine 12. In this way, operation of the grid guidance device 10 and the concomitant adjustment of the platform 32 is carried out in an automated manner. A suitable PLC controller is commercially available as Model No. 5069-L330ERMS2 from Allen-Bradley Brand and a suitable HMI is also commercially available as Model No. 2711P-T7C22D9P from Allen Bradley Brand of Milwaukee, Wisconsin, USA. Suitable servo motors are commercially available as Model No. VPL-B0631T-PJ14AA from Rockwell Automation of Milwaukee, Wisconsin USA. Still, other controllers, HMIs, and motor products from other companies are possible.

As shown in FIGS. 3 and 4, the platform 32 may be generally rectangular with a substantially planar upper face 60 on which a portion of a strip of grids may be received and advanced from the entrance end 34 to the downstream exit end 36 of the platform 32. To facilitate transfer of a strip of grids from an upstream feeder such as a conveyor or strip uncoiler, the entrance end 34 may have a lip 62 with a generally arcuate portion extending from below the platform 32 to and merging with the platform's upper face 60. To facilitate positioning the downstream exit end 36 between the orifice plate 18 and the upper run 24 of the belt 26 and closely adjacent to the orifice 16 of the pasting machine 12, a bottom face 64 of the downstream end portion of the platform 32 may be tapered toward the downstream exit end 36. The platform 32 may have a transverse width greater than the maximum transverse width of the widest continuous strip of grids the grid guidance device 10 is designed to handle.

With general reference to FIG. 4, for movement toward and away from the orifice 16, the platform 32 may be carried by a pair of laterally spaced-apart linear slides 66 with carriages 68 carried by guide rails 70 that are attached to a frame 72 of the grid guidance device 10. Advancement and retraction movement toward and away (or forward and rearward) is effected via the platform drive mechanism 46. The movement is generally along direction A in FIG. 4. The platform 32 may be pivotally carried by the slides 66 such as by bearing blocks 74 attached to the underside of the platform 32 (desirably adjacent its upstream end) through which a shaft 76 is received and extends through coaxial bores through the carriages 68 of the slides 66 and may be retained therein by a clamp collar 78 attached adjacent each end and disposed axially outward of the associated carriage 68. The carriages 68 and thus the platform 32 may be advanced and retracted by a pair of racks 80 each attached to one of the carriages 68 such as by cap machine screws 82 and engaged by complementary gears 84 each connected such as by a key and way to a drive shaft 86 journaled for rotation by bearings 88 carried by an associated guide rail 70 through which the drive shaft 86 extends. The racks 80 and gears 84 can constitute a rack-and-pinion arrangement. The racks 80 have teeth for tooth-to-tooth engagement with the gears 84. The drive shaft 86 and thus the gears are connected for rotation in unison by the reversible servo second electric motor 48 through a speed reducer gear box 90 attached to the frame 72. The frame 72 may include a pair of laterally spaced apart and vertically extending ground support legs 92 rigidly interconnected by a cross brace 94, support plates 96, and bars 98 for attachment of the rails 70 of the slides 66 and a bracket 100 for mounting the gear box 90 and second electric motor 48.

As shown in FIG. 5, the downstream exit end 36 of the platform 32 may be pivotally raised and lowered by a rotatable camshaft 102 with an elongate cam 104 bearing on a bottom surface 33 of the platform 32 downstream of the pivot shaft 76. The raising and lowering is effected via the lift mechanism 50. The camshaft 102 may have coaxial cylindrical shaft portions 106 and 108 radially offset and off-centered relative to the cam 104 and each journaled for rotation in an associated carriage 68 of the linear slides 66. The cam 104 may be rotated to raise and lower the downstream exit end 36 of the platform 32 by the third electric motor 52 connected to the shaft portion 108 through a speed reducer gear box 110 attached to the carriage 68 of the adjacent slide 66. Surface-to-surface engagement and abutment is made between the cam 104 and the platform's bottom surface 33. The platform 32 is raised when a lobed protrusion of the cam 104 engages the bottom surface 33 of the platform 32, and is lowered as engagement migrates away from the lobed protrusion and to a non-lobed section of the camshaft 102.

As shown in FIG. 3, the continuous strip of grids may be laterally positioned on the platform 32 and relative to the orifice 16 of the pasting machine 12 by the guide assembly 40 which may have a pair of longitudinally-extending guide plates 114 which are laterally movable so they may be positioned close to the outer sides of a continuous strip of grids received between them. The lateral movement is effected via the guide assembly 40. Each guide plate 114 may be slideably received on transversely-extending guide rails 116 of a carrier plate 118 and attached to a pair of carriages 120 each slideably received in a slot 122 through its associated guide rail 116. The guide plates 114 both may be moved toward and away from each other, and in a lateral direction C, by the drive mechanism 42 which may have a rotatable shaft 124 with a first threaded portion 126 engaged with a complementary threaded first collar 128 attached to one of the guide plates 114 and a second threaded portion 130 engaged with a complementary threaded second collar 132 attached to the other guide plate 114. So that rotation of the shaft 124 in one direction will move both guide plates 114 laterally toward each other, and rotation in the other opposite direction will move both guide plates 114 laterally away from each other, one of the threaded portions 126 or 130 may have right-hand threads and the other threaded portion may have left-hand threads, and each with complementary right- or left-hand threads of its associated collar 128 or 132. Adjacent one end, the shaft 124 may have a cylindrical portion 134 journaled for rotation in a support bracket 136 that is attached to the carrier plate 118 and, adjacent its other end, the shaft 124 may be connected to the first electric motor 44 through a speed reducing gear box 140 for rotating the shaft 124. The gear box 140 may be attached to a support bracket 142 that is attached to the carrier plate 118. The shaft 124 may also have a cylindrical intermediate portion 144 between the threaded portions which may be journaled for rotation in a support bracket 146 that is attached to the carrier plate 118. If desired, a manual clamp assembly for releasably securing the guide plates 114 in a desired position may be provided such as by overlapping arms 150 and 152, each attached to one of the guide plates 114 with one arm having a longitudinally extending through slot 154 through which a threaded shaft 156 may extend and engage a complementary threaded bore in the other arm and may have a handle 158 attached adjacent its other end for manually rotating the shaft 156 in one direction to clamp together the arms 150, 152 and in the other direction to release them so that the guide plates 114 may be moved by operation of the first electric motor 44.

Still referring to FIG. 3, the carrier plate 118 overlies at least part of the platform 32 and may have laterally spaced apart and longitudinally-extending side rails 160 bearing on the platform 32 and with a raised or recessed planar bottom surface 162 (FIG. 2) substantially parallel to and spaced above the upper face 60 of the platform 32 so that the continuous strip 22 can pass between them. To facilitate entry of an underlying portion of the continuous strip 22 of battery grids 20, adjacent its upstream entrance end 34 the carrier plate 118 may have a tapered portion 164 of its bottom surface which may merge into the bottom surface 162 and adjacent its downstream exit end 36 may have spaced apart fingers 166 which may be relatively thin so that in use the fingers 166 may be disposed under at least part of the upstream portion of the hopper's orifice plate 18.

The guide assembly 40 may be either fixed to the platform 32 or removeably connected to it. If desired, the guide assembly 40 may be readily removable from the platform 32 such as by providing the side rails 160 of the carrier plate 118 with wedge-shaped or tapered members 168 slideable into a recess in guide blocks 167 with a complementary tapered surface inclined to slope downwardly toward the downstream exit end 36 of the platform 32 and attached to it such as by cap machine screws. These guide blocks 167 may also have a planar surface 169 parallel to and disposed close to the sides of the carrier plate 118 to align it with the platform 32 and facilitate entry of the tapered members 168 into the guide blocks 167. If desired, the carrier plate 118 may be located and releasably retained on the platform 32 when engaged with the guide blocks such as by pins 170 yieldably biased into and received in bores in the side rails 160. If desired, when the guide assembly 40 is disengaged from the guide blocks 167 it may be suspended above the platform 32 by a pair of brackets 172 attached to the carrier plate 118 and having stub pins 174 receivable in brackets 176 attached to the frame 72, and a support leg 178 pivotally attached to the guide assembly 40 and rotatable to bear on the carriage 68 of the adjacent slide 66.

Moreover, the grid guidance device 10 can include other components that furnish and facilitate its positioning functionality. For example, various position sensors can be equipped at various moveable components that move amid position adjustments. The position sensors serve to detect the position of the particular component and relay that position to the electronic controller 54 in the form of an electronic signal communicated thereto. Positional feedback control may then be administered by the electronic controller 54.

As shown in FIG. 1, for use the grid guidance device 10 may be installed and located adjacent the upstream end of the hopper 18 of a battery grid pasting machine 12 desirably with the downstream exit end 36 of the platform 32 extending between the upstream end of the orifice plate 18 and an underlying portion of the belt 26. The platform 32 can hence reside at a location that is upstream of the orifice plate 18 and upstream of the orifice 16. In operation of the battery grid pasting machine 12, the location and position of the platform 32 may be adjusted within design limits to provide the extent or thickness of any desired overpasting of one or both faces of the battery grids 20 as the continuous strip 22 is moved past the orifice 16 of the hopper 14 of the battery grid pasting machine 12 typically by its belt 26. The continuous strip 22 may be advanced to the grid guidance device 10 such a by a conveyor or continuous strip uncoiler upstream of the grid guidance device 10. If the data for the desired position of the platform 32 is already known, it may be entered by an operator using the HMI 56 and the controller 54 will actuate and deactuate and activate and deactivate one or more of the first, second, or third electric motors 44, 48, 52 to position the platform 32 for guiding the battery grids 20 of the continuous strip 22 past the orifice 16 of the hopper 14. If the desired position of the platform 32 is not known, it may be empirically determined by the operator using the HMI 56 to enter position data and observing and typically measuring the thickness of the overpasting produced by the battery grid pasting machine 12 with the platform 32 in the position produced by such position data and based on the resulting overpasting or lack thereof selecting and entering a new set of data and repeating this data selection routine until the desired thickness of any overpasting of the battery grids 20 is achieved.

If desired, data may be entered for only one platform variable at a time to determine the effect of changing such one variable before trying various combinations of data to actuate two or all three of the first, second, or third electric motors 44, 48, 52 to achieve the extent of any desired overpasting of one or both faces of the battery grids 20. For example, without limitation, an operator might first enter only data to actuate the first motor 44 to position the guide plates 114 relative to the continuous strip 22 of battery grids 20 passing between them, then second might enter only data to actuate the third motor 52 to raise and/or lower the downstream exit end 36 of the platform 32 to determine the effect thereof, and then third might enter only data to actuate the second motor 48 to advance and/or retract the downstream exit end 36 of the platform 32. Thereafter, an operator may experiment with various combinations of data and particularly raising and lowering the platform 32 and advancing and retracting it to achieve the desired thickness of any desired overpasting. Skilled persons may readily develop other methods and procedures for determining the data for the grid guidance device 10 in coordination with the pasting machine 12 to produce the extent of any desired overpasting of one or both faces of the battery grids 20 of a continuous strip 22. Skilled persons may also readily develop modifications of the grid guidance device 10 to provide any desired overpasting of separate individual grids fed consecutively to a pasting machine for pasting them.

Figure 6:
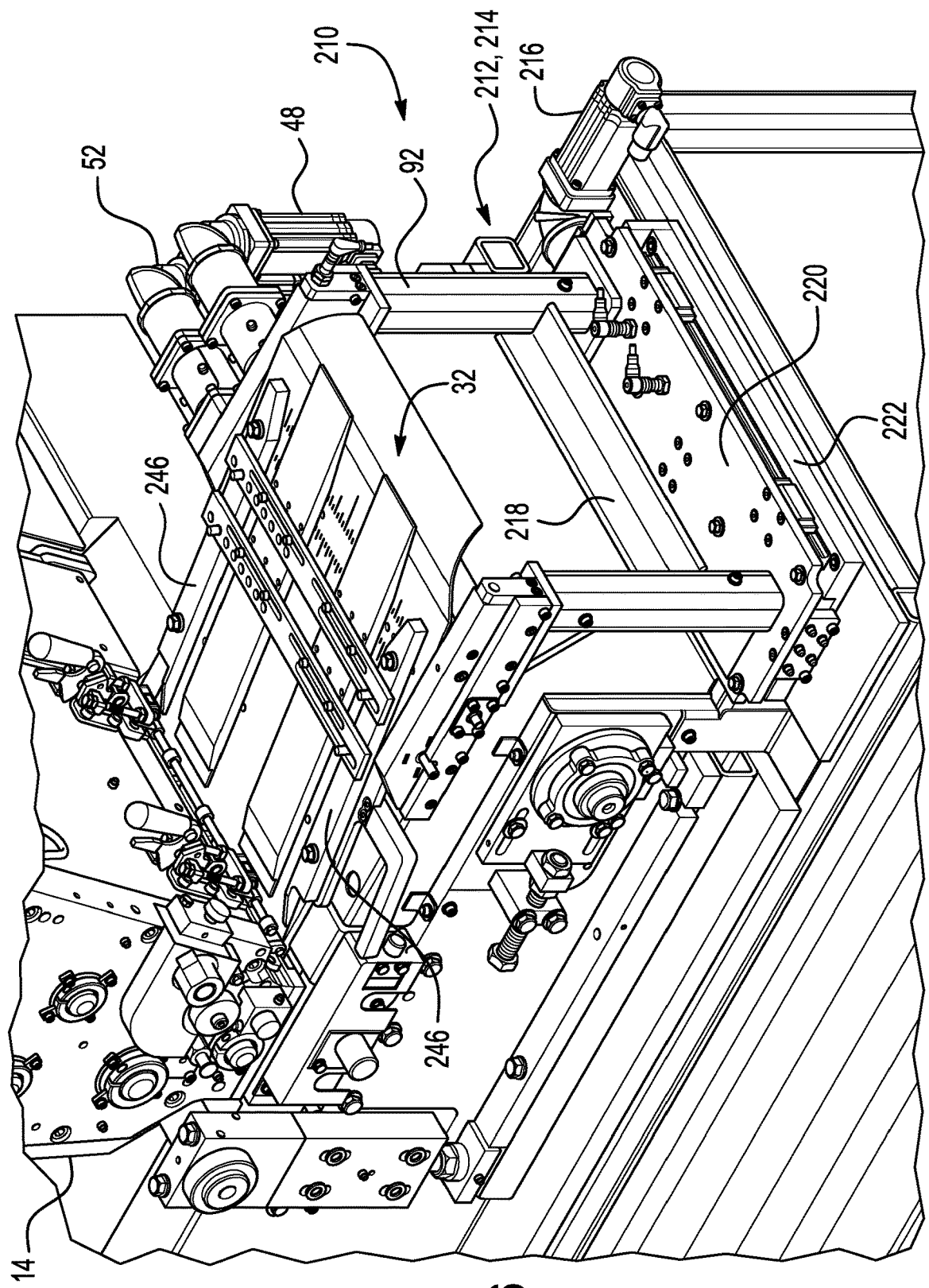
FIG. 6 is a segmented view of another embodiment of a grid guidance device.
Figure 7:
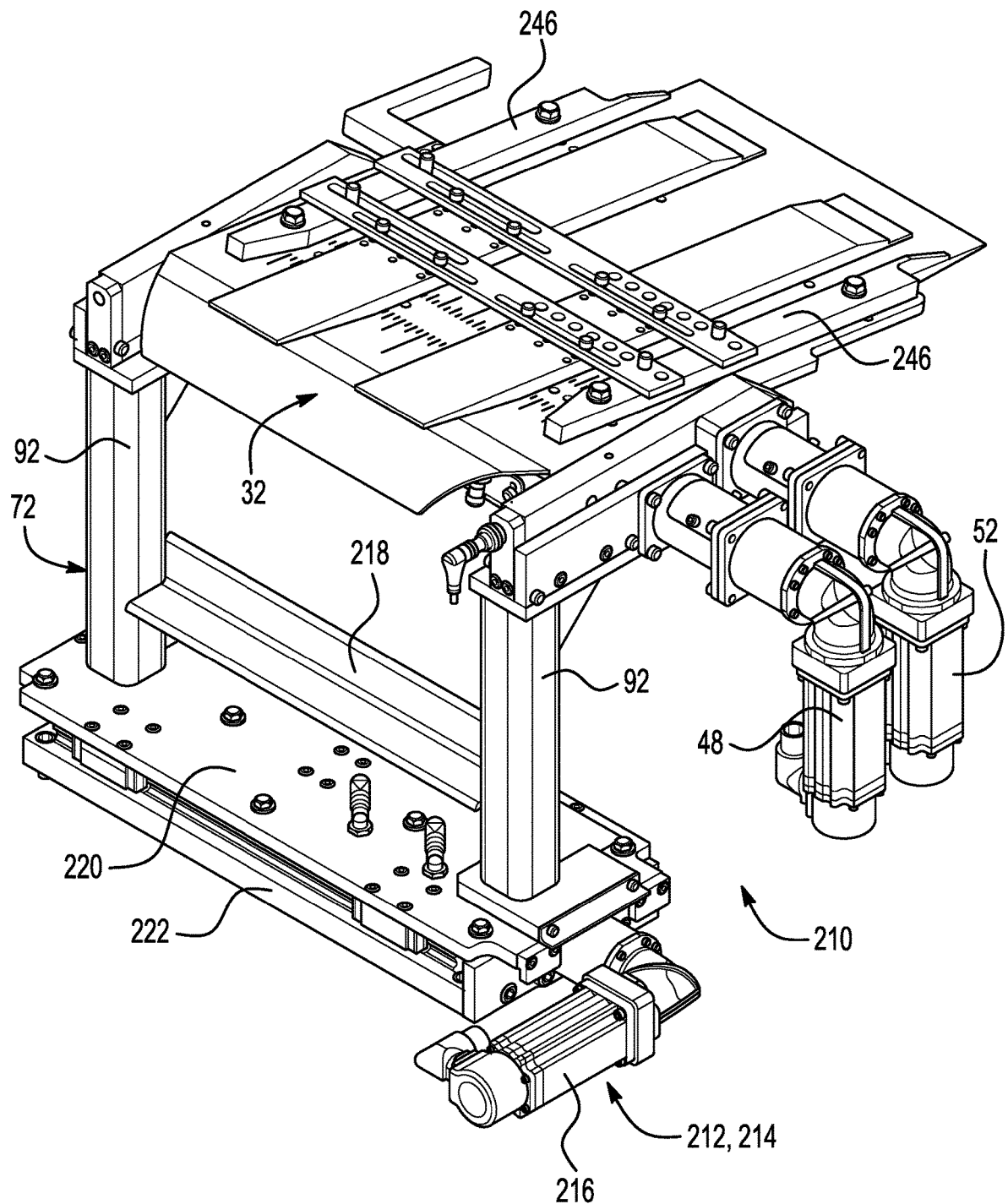
FIG. 7 is a perspective view of the grid guidance device of FIG. 6.
Figure 8:
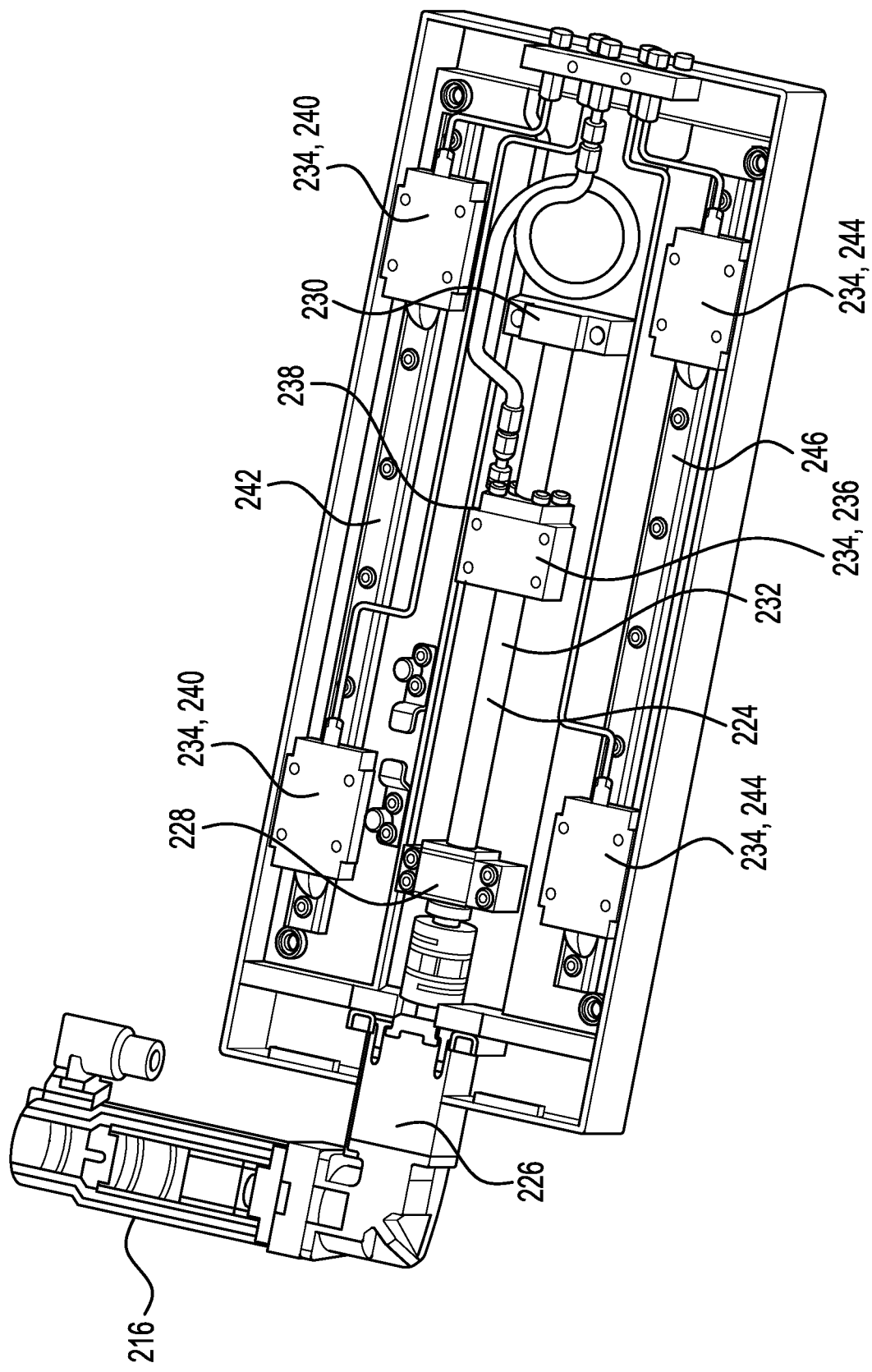
FIG. 8 is an internal view of part of an embodiment of a guide assembly of the grid guidance device of FIG. 6.

A further embodiment of a grid guidance device 210 is presented in FIGS. 6-8. The grid guidance device 210 in this further embodiment may exhibit certain similarities to the embodiment described with reference to FIGS. 1-5, and some of those similarities may not necessarily be repeated herein with the description related to FIGS. 6-8; for instance, the platform drive mechanism 46 and lift mechanism 50 can be substantially similar as previously described. A difference in the embodiment of FIGS. 6-8 is a relocation of a guide assembly 212 and its guide adjustment mechanism 214 and first electric motor 216 for making lateral position adjustments to the continuous strip of battery grids traveling over the platform 32 and with respect to the orifice 16. Main components of the guide assembly 212 reside at a lower location compared to the previous embodiment of FIGS. 1-5 and are distanced from the platform 32. The continuous strip of battery grids at the platform 32 in the embodiment of FIGS. 6-8 lacks obstruction by the guide assembly 212 and can hence be more readily viewed and inspected thereat by an operator. Furthermore, it has been found that the relocation facilitates initial entry and feeding of the continuous strip of battery grids at the platform 32, and better protects and shields the moving components of the guide assembly 212 from external effects.

With particular reference to FIGS. 6 and 7, the guide assembly 212 resides at bottom ends of the support legs 92 of the frame 72. A cross-bar 218 extends across the support legs 92 and is mounted to each support leg 92 for additional bracing and support thereat. The support plates 96 carry the platform 32 and carry other components residing at an upper region of the grid guidance device 10. The support legs 92 extend downward to a plate 220 and can be mounted thereto. The plate 220 carries the support legs 92. The plate 220 serves as a cover for internal components of the guide assembly 212. The plate 220 is removed in FIG. 8 in order to expose these internal components for the purpose of this description. A bottom plate 222 can be provided opposite the plate 220. The plate 220 and bottom plate 222 can constitute parts of a larger housing of the guide assembly 212. The first electric motor 216 is mounted at a side of the guide assembly's housing adjacent the bottom ends of the support legs 92. As before, the first electric motor 216 can be a reversible servo motor or a stepper motor. The first electric motor 216 drives rotation of a first shaft 224, and a speed reducing gear box 226 can be provided as before. The first shaft 224 is journaled for rotation at a first or proximal support bracket 228 and at a second or distal support bracket 230. The first and second support brackets 228, 230 are mounted in isolation from the lateral position adjustments made amid use by the guide assembly 212. The first shaft 224 has a threaded shaft portion 232 that can span over a partial or full axial extent of the first shaft 224. The threads furnished at the threaded shaft portion 232 can be external threads.

Furthermore, in this embodiment, and with continued reference to FIG. 8, mounting blocks 234 are provided that move linearly and laterally side-to-side upon rotation of the first shaft 224 in order to effect the lateral position adjustments made amid use of the guide assembly 212. Rotational movement is hence translated to linear movement in the guide assembly 212. A first mounting block 236 of the mounting blocks 234 is disposed around the first shaft 224 at the threaded shaft portion 232. The first mounting block 236 can have a threaded collar 238 at its interior or at a side thereof. The threaded collar 238 can be an integral part of the first mounting block 236, or can be a separate and discrete component situated at a side of the first mounting block 236. The threads furnished at the threaded collar 238 mesh with the threads of the threaded shaft portion 232. Rotation of the first shaft 224 in a first rotational direction (e.g., clockwise) can result in linear movement of the threaded collar 238 and of the first mounting block 236 in a first lateral direction (e.g., right) along an axis of the first shaft 224. And, conversely, rotation of the first shaft 224 in a second rotational direction (e.g., counterclockwise) can result in linear movement of the threaded collar 238 and of the first mounting block 236 in a second lateral direction (e.g., left)

along the axis of the first shaft 224. The first mounting block 236 moves with respect to the first shaft 224 and with respect to the first and second support brackets 228, 230. In other words, the first and second brackets 228, 230 remain static in terms of linear movement relative to the movement of the first mounting block 236.

Further, a first set of mounting blocks 240 moves concurrently with movement of the first mounting block 236. A first linear bearing assembly 242 facilitates lateral movement of the first set of mounting blocks 240. The first set of mounting blocks 240 can be carried by the first linear bearing assembly 242 and can slide back-and-forth and side-to-side with respect thereto upon movement of the first mounting block 236. In a similar way, a second set of mounting blocks 244 moves concurrently with movement of the first mounting block 236. A second linear bearing assembly 246 facilitates lateral movement of the second set of mounting blocks 244. The second set of mounting blocks 244 can be carried by the second linear bearing assembly 246 and can slide back-and-forth and side-to-side with respect thereto upon movement of the first mounting block 236. As shown in FIG. 8, a total of five mounting blocks are furnished in this embodiment, but other quantities of mounting blocks including more or less than five could be furnished in other embodiments. The mounting blocks 234 are mounted to the plate 220. The mounting can in the form of fastening.

Lateral movement of the first mounting block 236 causes concurrent lateral movement of the plate 220, and the plate 220, in turn, propels lateral movement of the first and second sets of mounting blocks 240, 244. In this way, the first mounting block 236 drives the lateral movement of the comparatively passive first and second sets of mounting blocks 240, 244. The first and second sets of mounting blocks 240, 244 serve to assist in bearing loads exerted amid use. In FIG. 7, all components of the grid guidance device 210 that reside vertically above the plate 220 are caused to move laterally with the mounting blocks 234—this includes the frame 72 and its support legs 92, the platform 32, the platform drive mechanism 46 and its second electric motor 48, as well as the lift mechanism 50 and its third electric motor 52. The bottom plate 222, first electric motor 216, first shaft 224, and first and second support brackets 228, 230, in contrast, are among the components that lack such lateral movement. The lateral movement of the platform 32, in turn, imparts lateral position adjustments to the continuous strip of battery grids subject to handling by the platform 32 via side guides 246. The side guides 246 are elongated plates mounted on top of the platform 32 and generally arranged in the direction of movement of the continuous strip of battery grids on the upper run 24. The side guides 246 can be fastened to the platform 32. The side guides 246 can be manually set to the lateral width dimension of the continuous strip of battery grids, with one of the side guides 246 situated on one side of the continuous strip and the other of the side guides 246 situated on the opposite side of the continuous strip. The side guides 246 move laterally with the mounting blocks 234 and with the platform 32 amid use of the guide assembly 212, moving the continuous strip of battery grids as well.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A grid guidance device for guiding battery grids to a battery pasting machine, the grid guidance device comprising:
a platform carried by the battery pasting machine at a location that is upstream of a pasting orifice of the battery pasting machine, the platform receiving the battery grids thereover prior to pasting of the battery grids at the pasting orifice; and
an assembly operably associated with the platform in order to adjust the position of the platform with respect to the pasting orifice of the battery pasting machine, the assembly comprising a first electric motor, a first shaft, a second electric motor, a second shaft, a third electric motor, and a third shaft, wherein a transverse position of the battery grids with respect to the pasting orifice is adjustable via rotation of the first shaft by the first electric motor, an advancement and retraction position of at least an exit end of the platform with respect to the pasting orifice is adjustable via rotation of the second shaft by the second electric motor, and a raising and lowering position of at least the exit end of the platform with respect to the pasting orifice is adjustable via rotation of the third shaft by the third electric motor.

2. The grid guidance device as set forth in claim 1, wherein, in order to carry out the position adjustments with respect to the pasting orifice of the battery pasting machine, the assembly further comprises at least one of a threaded shaft portion, a threaded collar, a toothed rack, a gear, or a cam.

3. The grid guidance device as set forth in claim 1, wherein the assembly further comprises a cam carried by the third shaft, and wherein, upon rotation of the third shaft by the third electric motor, the cam engages the platform in order to adjust the raising and lowering position of the at least exit end of the platform with respect to the pasting orifice.

4. The grid guidance device as set forth in claim 1, further comprising a controller and a human-machine-interface (HMI), the controller electrically connected to the first, second, and third electric motors for activation and deactivation of the first, second, and third electric motors, the HMI electrically connected to the controller and providing operator management of the grid guidance device.

5. A battery pasting machine comprising the grid guidance device of claim 1.

6. The grid guidance device as set forth in claim 1, wherein the assembly further comprises at least one rack and at least one gear, and wherein, upon rotation of the second shaft by the second electric motor, the at least one rack and the at least one gear engage with each other and the at least one rack moves relative to the second shaft in order to adjust the advancement and retraction position of the at least exit end of the platform with respect to the pasting orifice.

7. The grid guidance device as set forth in claim 6, wherein the assembly further comprises at least one carriage and at least one guide rail, the at least one carriage slidable in the at least one guide rail upon movement of the at least one rack.

8. The grid guidance device as set forth in claim 1, wherein the assembly further comprises at least one threaded collar, the first shaft having at least one threaded portion, and wherein, upon rotation of the first shaft by the first electric motor, the at least one threaded collar moves on the at least one threaded portion relative to the first shaft in order to adjust the transverse position of the battery grids with respect to the pasting orifice.

9. The grid guidance device as set forth in claim 8, wherein the assembly further comprises at least one guide plate moved transversely by movement of the at least one threaded collar.

10. The grid guidance device as set forth in claim 9, wherein the assembly further comprises a carrier plate carrying the at least one guide plate, the carrier plate overlying at least a section of the platform.

11. The grid guidance device as set forth in claim 8, wherein the assembly further comprises at least one mounting block moved transversely by movement of the at least one threaded collar.

12. The grid guidance device as set forth in claim 11, wherein the assembly further comprises a plate and at least one side guide situated at at least one side of the battery grids, the plate carried by the at least one mounting block, and wherein transverse movement of the at least one mounting block causes transverse movements of the plate and of the at least one side guide in order to adjust the transverse position of the battery grids with respect to the pasting orifice.

13. The grid guidance device as set forth in claim 11, wherein the assembly further comprises at least one linear bearing assembly, the at least one mounting block moving transversely via the at least one linear bearing assembly.

14. The grid guidance device as set forth in claim 13, wherein the assembly further comprises a plate and at least one support leg, the plate and at least one support leg carried by the at least one mounting block and moving transversely therewith.

15. A grid guidance device for guiding battery grids to a battery pasting machine, the grid guidance device comprising:
 a platform receiving the battery grids thereover;
 a first electric motor, a first shaft with at least one threaded portion, and at least one mounting block received on the first shaft at the at least one threaded portion, wherein a transverse position of the battery grids with respect to a pasting orifice of the battery pasting machine is adjustable via rotation of the first shaft by the first electric motor and consequential movement of the at least one mounting block over the first shaft;
 a second electric motor, a second shaft, at least one rack, and at least one gear, wherein an advancement and retraction position of at least an exit end of the platform with respect to the pasting orifice is adjustable via rotation of the second shaft by the second electric motor and consequential engagement between the at least one rack and at least one gear; and
 a third electric motor, a third shaft, and at least one cam carried by the third shaft, wherein a raising and lowering position of at least the exit end of the platform with respect to the pasting orifice is adjustable via rotation of the third shaft by the third electric motor and consequential engagement from the at least one cam.

16. The grid guidance device as set forth in claim 15, further comprising a plate and at least one side guide situated at at least one side of the battery grids, the plate carried by the at least one mounting block, and wherein movement of the at least one mounting block causes movements of the plate and of the at least one side guide in order to adjust the transverse position of the battery grids with respect to the pasting orifice.

17. The grid guidance device as set forth in claim 15, further comprising at least one carriage and at least one guide rail, the at least one carriage slidable in the at least one guide rail upon engagement between the at least one rack and the at least one gear.

18. The grid guidance device as set forth in claim 15, further comprising a controller and a human-machine-interface (HMI), the controller electrically connected to the first, second, and third electric motors for activation and deactivation of the first, second, and third electric motors, the HMI electrically connected to the controller and providing operator management of the grid guidance device.

19. A battery pasting machine comprising the grid guidance device of claim 15.

* * * * *